(12) United States Patent
Woodall

(10) Patent No.: US 7,742,110 B1
(45) Date of Patent: Jun. 22, 2010

(54) COMB FILTER SYSTEM AND METHOD

(75) Inventor: Neil D. Woodall, Newport Beach, CA (US)

(73) Assignee: Pixelworks, Inc., Tualatin, OR (US)

( * ) Notice: Subject to any disclaimer, the term of this patent is extended or adjusted under 35 U.S.C. 154(b) by 0 days.

(21) Appl. No.: 12/424,430

(22) Filed: Apr. 15, 2009

Related U.S. Application Data

(62) Division of application No. 11/187,683, filed on Jul. 22, 2005, now Pat. No. 7,532,254.

(51) Int. Cl.
H04N 9/78 (2006.01)
H04N 9/77 (2006.01)

(52) U.S. Cl. ............... 348/665; 348/609; 348/663; 348/666; 348/667; 348/669

(58) Field of Classification Search ......... 348/663–670, 348/609, 610, 630, 631, 712, 713; 382/275, 382/260, 261

See application file for complete search history.

(56) References Cited

U.S. PATENT DOCUMENTS

| | | | |
|---|---|---|---|
| 3,860,952 A | | 1/1975 | Tallent, et al. |
| 4,196,445 A | | 4/1980 | Okada et al. |
| 4,200,881 A | * | 4/1980 | Carnt et al. ............ 386/13 |
| 4,443,821 A | | 4/1984 | Kato |
| 4,641,180 A | | 2/1987 | Richter |
| 4,651,196 A | * | 3/1987 | Harwood et al. ........ 348/667 |
| 4,675,724 A | | 6/1987 | Wagner |
| 4,855,815 A | | 8/1989 | Yasuki et al. |
| 5,097,321 A | | 3/1992 | Stern et al. |
| 5,121,203 A | | 6/1992 | Citta |
| 5,121,207 A | | 6/1992 | Herrmann |
| 5,134,467 A | | 7/1992 | Kim |
| 5,142,377 A | | 8/1992 | Moriyama et al. |
| 5,231,478 A | | 7/1993 | Fairhurst |
| 5,260,839 A | | 11/1993 | Matsuta et al. |
| 5,305,120 A | | 4/1994 | Faroudja |
| 5,345,276 A | | 9/1994 | Hong |
| 5,355,176 A | | 10/1994 | Inagaki et al. |
| 5,359,366 A | | 10/1994 | Ubukata et al. |
| 5,367,338 A | | 11/1994 | Rothermel et al. |
| 5,394,193 A | | 2/1995 | Kim |

(Continued)

FOREIGN PATENT DOCUMENTS

EP 0449501 10/1991

(Continued)

Primary Examiner—David L Ometz
Assistant Examiner—Jean W Désir
(74) Attorney, Agent, or Firm—Marger, Johnson & McCollom, P.C.

(57) ABSTRACT

I describe and claim a temporal comb filtering system and method. The temporal comb filter system includes a comb filter to temporally process separated luminance and chrominance components from an image field responsive to image data from at least one other image field and a panel to display the processed components. The comb filter includes a cross-chroma detector to detect luminance information within chrominance data from a first image field responsive to chrominance data from at least one other image field and a cross-luma detector to detect chrominance information within the luminance data from the first image field responsive to the luminance data from at least one other image field.

20 Claims, 8 Drawing Sheets

U.S. PATENT DOCUMENTS

| | | | |
|---|---|---|---|
| 5,418,818 | A | 5/1995 | Marchetto et al. |
| 5,448,305 | A | 9/1995 | Hagino |
| 5,483,294 | A | 1/1996 | Kays |
| 5,506,932 | A | 4/1996 | Holmes et al. |
| 5,525,984 | A | 6/1996 | Bunker |
| 5,526,129 | A | 6/1996 | Ko |
| 5,543,860 | A * | 8/1996 | Cho ............ 348/666 |
| 5,600,379 | A | 2/1997 | Wagner |
| 5,663,771 | A | 9/1997 | Raby |
| 5,686,972 | A | 11/1997 | Kim |
| 5,710,729 | A | 1/1998 | Feste et al. |
| 5,748,842 | A | 5/1998 | Holmes et al. |
| 5,909,255 | A | 6/1999 | Hatano |
| 5,940,138 | A | 8/1999 | Lowe |
| 5,953,071 | A | 9/1999 | Van Zon |
| 5,963,268 | A | 10/1999 | Ko |
| 5,990,978 | A | 11/1999 | Kim et al. |
| 6,052,748 | A | 4/2000 | Suominen et al. |
| 6,173,003 | B1 | 1/2001 | Whikehart et al. |
| 6,175,389 | B1 | 1/2001 | Felts, III et al. |
| 6,208,671 | B1 | 3/2001 | Paulos et al. |
| 6,288,754 | B1 * | 9/2001 | Ito ................ 348/663 |
| 6,297,849 | B1 | 10/2001 | Stessen et al. |
| 6,300,985 | B1 * | 10/2001 | Lowe et al. ........ 348/665 |
| 6,462,790 | B1 | 10/2002 | Lowe et al. |
| 6,581,164 | B1 | 6/2003 | Felts, III et al. |
| 6,614,474 | B1 | 9/2003 | Malkin et al. |
| 6,714,717 | B1 | 3/2004 | Lowe et al. |
| 6,744,472 | B1 | 6/2004 | MacInnis et al. |
| 6,774,954 | B1 | 8/2004 | Lee |
| 6,795,001 | B2 | 9/2004 | Roza |
| 6,795,126 | B1 | 9/2004 | Lee |
| 6,804,697 | B2 | 10/2004 | Bugeja et al. |
| 6,956,620 | B2 | 10/2005 | Na |
| 7,076,113 | B2 | 7/2006 | Le Dinh |
| 7,102,692 | B1 | 9/2006 | Carlsgaard et al. |
| 7,227,587 | B2 * | 6/2007 | MacInnis et al. ....... 348/667 |
| 7,327,405 | B1 * | 2/2008 | Lowe et al. ......... 348/663 |

FOREIGN PATENT DOCUMENTS

EP 0549375 6/1993

* cited by examiner

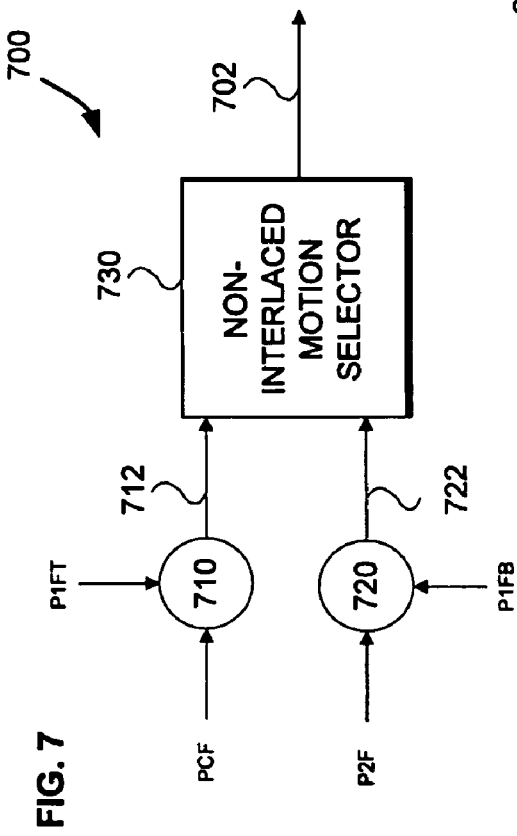

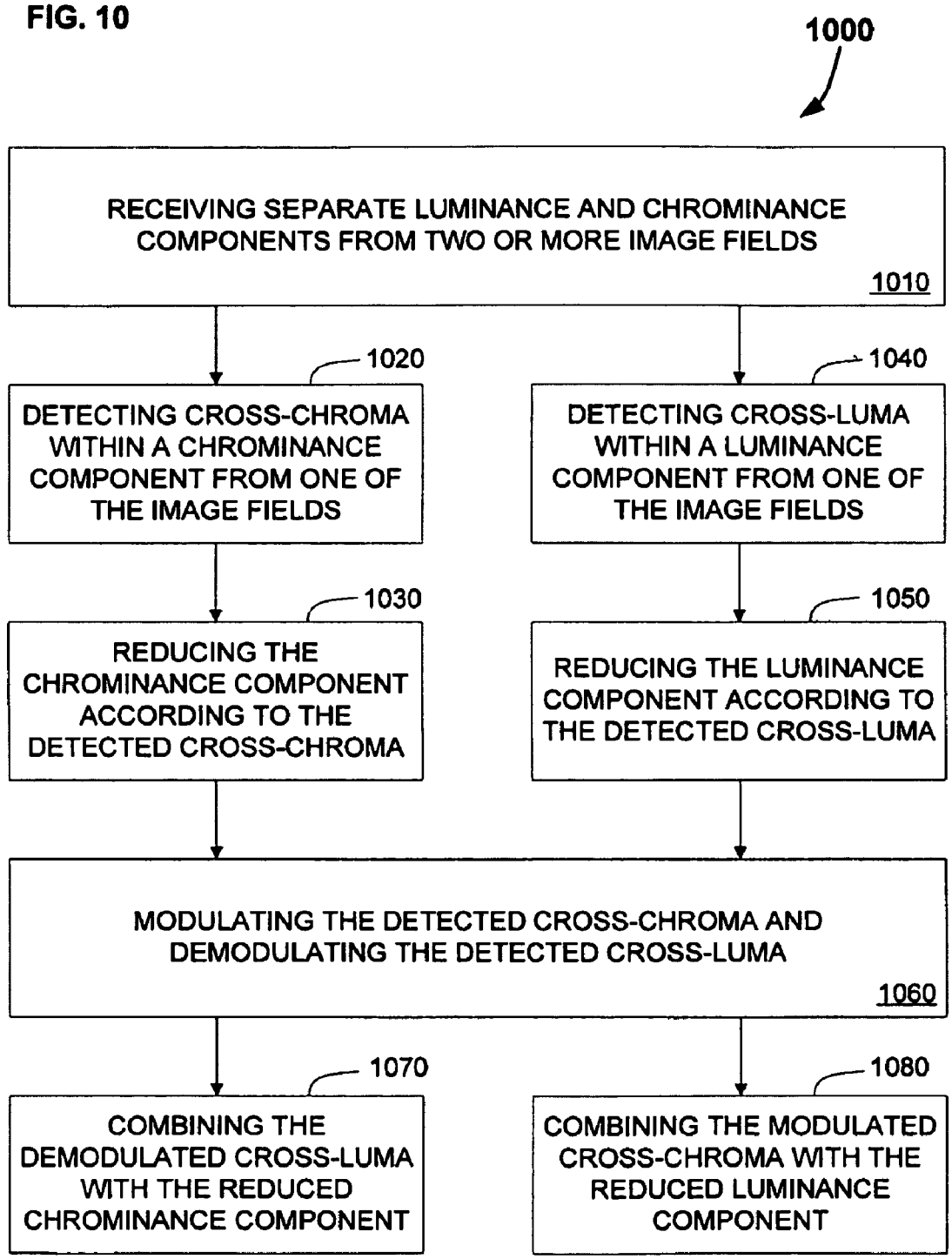

COMB FILTER SYSTEM AND METHOD

REFERENCE TO RELATED APPLICATIONS

This application is a divisional of prior U.S. patent application Ser. No. 11/187,683, filed Jul. 22, 2005, which claims the benefit of U.S. Provisional Patent Application Ser. No. 60/472,280, filed Jan. 5, 2005, and is a continuation-in-part of prior U.S. patent application Ser. No. 10/833,979, filed Apr. 27, 2004, now U.S. Pat. No. 7,304,688, issued on Dec. 4, 2007, which claims the benefit of U.S. Provisional Patent Application Ser. No. 60/472,280, filed May 20, 2003. All of these related applications are hereby incorporated herein by reference.

FIELD OF THE INVENTION

This invention relates to image processing and, more specifically, to a system and method for temporally comb filtering a video signal.

BACKGROUND OF THE INVENTION

Composite video signals, commonly used in video broadcasts or transmissions, contain a brightness signal (luminance, luma or Y) and a color signal (chrominance, chroma or C), where the color signal is modulated into a color sub-carrier and added to the brightness signal prior to transmission. To effectuate demodulation of the color sub-carrier upon reception, receivers for color displays include a Y/C separator to separate luminance and chrominance components from the composite video signal. Y/C separators, however, often permit crosstalk, e.g., when luma is separated into the chrominance component (cross chroma) and chroma is separated into the luminance component (cross luma). The Y/C crosstalk generally degrades the quality of displayed video pictures.

One technique to reduce Y/C crosstalk is to separate composite video signals according to their temporal changes using three-dimensional (3D) comb filters. Previous 3D comb filtering, however, has been confined to Y/C separation, which limits its use to composite video signals and complicates the development of a multi-standard 3D comb filter. Furthermore, applying the 3D comb filters before the demodulation of the color sub-carrier requires special circuitry to detect locking of the horizontal and chrominance frequencies. Accordingly, a need remains for a system and method for improved temporal processing of video signals.

BRIEF DESCRIPTION OF THE DRAWINGS

The foregoing and other objects, features, and advantages of the invention will become more readily apparent from the following detailed description of a preferred embodiment that proceeds with reference to the following drawings.

FIG. 7 is a block diagram of an embodiment of the non-interlaced motion detector shown in FIG. 4.

FIG. 8 is a block diagram of an embodiment of the conventional motion detector shown in FIG. 4.

FIG. 10 is an example flowchart embodiment of a method for separately temporally processing luminance and chrominance components.

DESCRIPTION OF THE INVENTION

Figure 1:
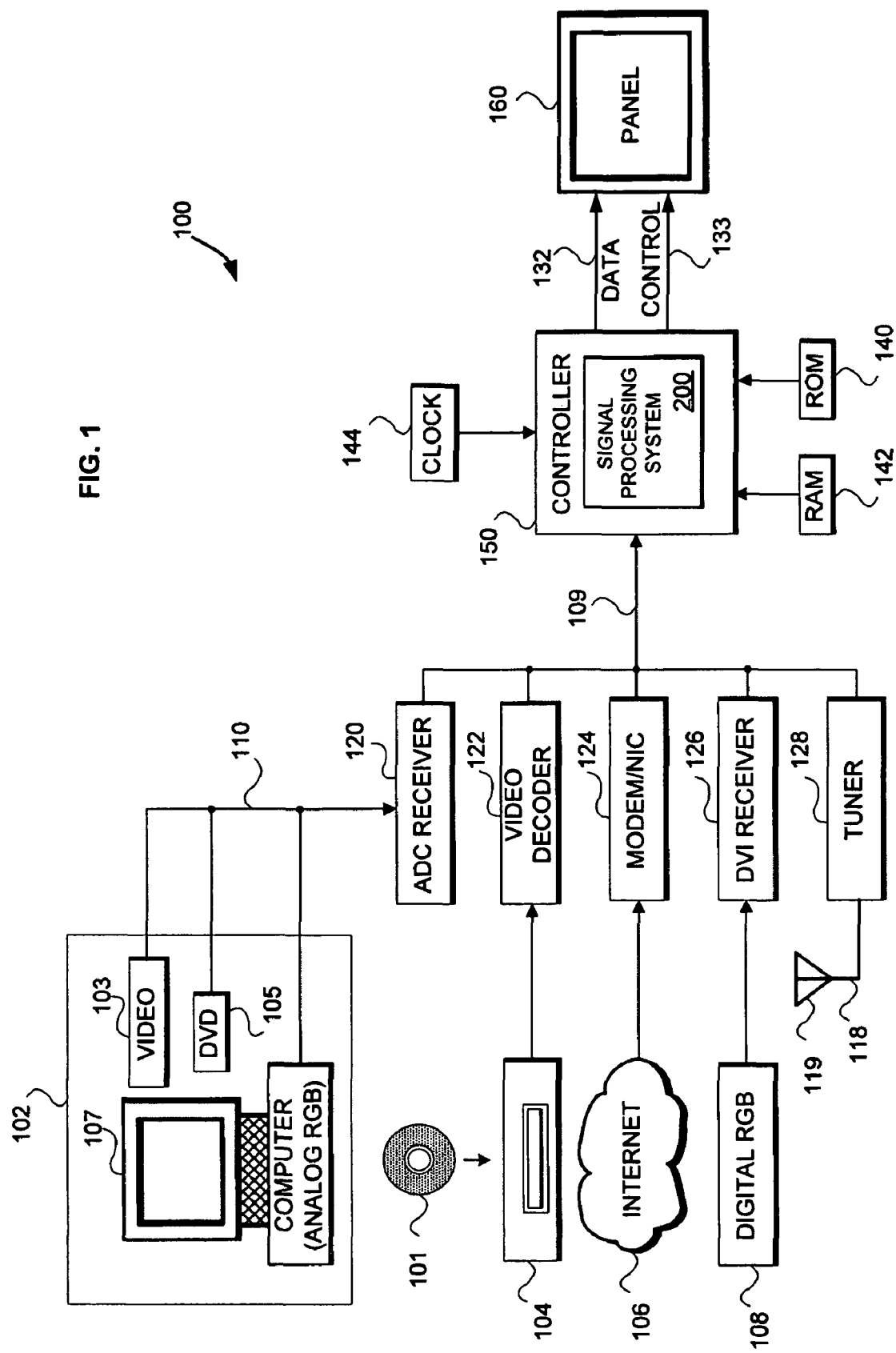
FIG. 1 is a block diagram of a display system.

FIG. 1 is a block diagram of a system 100. Referring to FIG. 1, the system 100 includes a receiver 120 for receiving an analog image data signal 110, e.g., RGB or $YP_BP_R$ signal, from a source 102. The source 102 may be a personal computer 107, a digital video disk player 105, set top box (STB) 103, or any other device capable of generating the analog or digital image data signal 110. The receiver 120 may be an analog-to-digital converter (ADC) or any other device capable of receiving an analog or digital video signal 109 from the analog image data 110. The receiver 120 converts the analog image data signal 110 into the digital image data 109 and provides it to a controller 150. A person of reasonable skill in the art knows well the design and operation of the source 102 and the receiver 120.

Likewise, a video receiver or decoder 122 may optionally decode an analog video signal 112 from a video source 104 when the input is in the composite or s-video format. The video source 104 may be a video camcorder, tape player, digital video disk (DVD) player, or any other device capable of generating the analog or digital video signal 112. The video source 104 may read (or play) external media 101. In an embodiment, a DVD player 104 plays the DVD 101. In another embodiment, a VHS tape player 104 plays a VHS tape 101. The decoder 122 converts the analog video signal 112 into the digital video signal 109 and provides it to the panel controller 150. The decoder 122 is any device capable of generating digital video signal 109, e.g., in Y/C or CVBS format, from the analog video signal 112. A person of reasonable skill in the art knows well the design and operation of the video source 104 and the video decoder 112.

A modem or network interface card (NIC) 124 receives data 114 from a global computer network 106 such as the Internet®. The data 114 may be in any format capable of transmission over the network 106. In an embodiment, the data 114 is packetized digital data. But the data 114 may also be in an analog form. Likewise, the modem 124 may be a digital or analog modem or any device capable of receiving data 114 from a network 106. The modem 124 provides digital video signal 109 to the panel controller 150. A person of reasonable skill in the art knows well the design and operation of the network 106 and the modem/NIC 124.

A Digital Visual Interface (DVI) or high definition multimedia interface (HDMI) receiver 126 receives digital signals 116 from a digital source 108. In an embodiment, the source 108 provides digital RGB signals 116 to the receiver 126. The receiver 126 provides digital video signal 109 to the panel controller 150. A person of reasonable skill in the art knows well the design and operation of the source 108 and the receiver 126.

A tuner 128 receives a wireless signal 118 transmitted by the antenna 119. The antenna 119 is any device capable of wirelessly transmitting or broadcasting the signal 118 to the tuner 128. In an embodiment, the antenna 119 transmits a television signal 118 to the television tuner 128. The tuner 128 may be any device capable of receiving a signal 118 transmitted wirelessly by any other device, e.g., the antenna 119, and of generating the digital video signal 109 from the wireless signal 118. The tuner 128 provides the digital video signal 109 to the controller 150. A person of reasonable skill in the art knows well the design and operation of the antenna 119 and the tuner 128.

The digital video signal 109 may be in a variety of formats, including composite or component video. Composite video describes a signal in which luminance, chrominance, and synchronization information are multiplexed in the frequency, time, and amplitude domain for single wire transmission. Component video, on the other hand, describes a system in which a color picture is represented by a number of video signals, each of which carries a component of the total video information. In a component video device, the component video signals are processed separately and, ideally, encoding into a composite video signal occurs only once, prior to transmission. The digital video signal 109 may be a stream of digital numbers describing a continuous analog video waveform in either composite or component form. FIG. 1 describes a variety of devices (and manners) in which the digital video signal 109 may be generated from an analog video signal or other sources. A person of reasonable skill in the art should recognize other devices for generating the digital video signal 109 come within the scope of the present invention.

The controller 150 generates image data 132 and control signals 133 by manipulating the digital video signal 109. The panel controller 150 provides the image data 132 and control signals 133 to a panel device 160. The panel 160 includes a pixelated display that has a fixed pixel structure. Examples of pixelated displays are active and passive LCD displays, plasma displays (PDP), field emissive displays (FED), electro-luminescent (EL) displays, micro-mirror technology displays, low temperature polysilicon (LTPS) displays, and the like. A person of reasonable skill in the art should recognize that flat panel 160 may be a television, monitor, projector, personal digital assistant, and other like applications. Although FIG. 1 shows a panel 160, any device capable of displaying digital video signal 109 may be used into system 100.

The controller 150 includes a signal processing system 200 to process digital video signal 109 according to temporal changes. Signal processing system 200 may be integrated into a monolithic integrated circuit or hardwired using any number of discrete logic and other components. Alternatively, the controller 150 may be a dedicated processor system that includes a microcontroller or a microprocessor to implement the signal processing system 200 as a software program or algorithm.

In an embodiment, the controller 150 may scale the digital video signal 109 for display by the panel 160 using a variety of techniques including pixel replication, spatial and temporal interpolation, digital signal filtering and processing, and the like. In another embodiment, the controller 150 may additionally change the resolution of the digital video signal 109, changing the frame rate and/or pixel rate encoded in the digital video signal 109. Scaling, resolution, frame, and/or pixel rate conversion, and/or color manipulation are not central to this invention and are not discussed in further detail.

Read-only (ROM) and random access (RAM) memories 140 and 142, respectively, are coupled to the display system controller 150 and store bitmaps, FIR filter coefficients, and the like. A person of reasonable skill in the art should recognize that the ROM and RAM memories 140 and 142, respectively, may be of any type or size depending on the application, cost, and other system constraints. A person of reasonable skill in the art should recognize that the ROM and RAM memories 140 and 142, respectively, are optional in the system 100. A person of reasonable skill in the art should recognize that the ROM and RAM memories 140 and 142, respectively, may be external or internal to the controller 150. RAM memory 142 may be a flash type memory device. Clock 144 controls timing associated with various operations of the controller 150.

Figure 2:
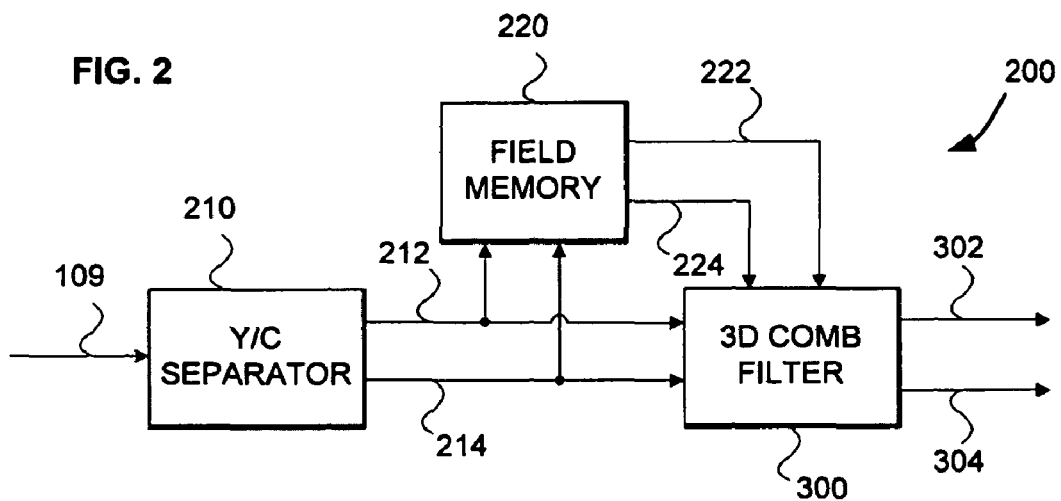
FIG. 2 is a block diagram of an embodiment of the signal processing system shown in FIG. 1.

Embodiments of the signal processing system 200 will be explained with reference to FIGS. 2-10. FIG. 2 is a block diagram of an embodiment of the signal processing system 200 shown in FIG. 1. Referring to FIG. 2, the signal processing system 200 includes a Y/C separator 210 to separate the digital video signal 109 into chrominance 212 and luminance 214 components and to provide the separated components 212 and 214 to a field memory 220 and a 3D comb filer 300. Y/C separator 210 may be a notch/bandpass filter set, a comb filter or a comb filter set implementing 1D or 2D separation, or may include both separators and adapt between them responsive to digital video signal 109. An adaptive Y/C separator is described in U.S. patent application Ser. No. 10/833, 979, filed Apr. 27, 2004, which we incorporate by reference. A person of reasonable skill in the art knows well the design and operation of the Y/C separator 210. Although FIG. 2 shows Y/C separator 210 generating components 212 and 214 from digital video signal 109, system 200 may receive components 212 and 214 directly when digital video signal 109 is a component video signal from an internal or external source. The processing system 200 may include a video demodulator (not shown) to demodulate the chrominance component 212 according to a sub-carrier phase and frequency, and provide the demodulated chrominance component 212 to the field memory 220 and the 3D comb filter 300. In the following embodiments, the chrominance component 212 is considered to be demodulated unless otherwise specified.

The field memory 220 stores one or more image fields from digital video signal 109 separated into chrominance 212 and luminance 214 components, and provides the stored chrominance 222 and luminance 224 components to the 3D comb filter 300. Components 212 and 214 may represent data, e.g., a pixel or group of pixels, within a current image field, while stored components 222 and 224 may represent data corresponding to components 212 and 214 from at least one previous image field. Although FIG. 2 shows only one interconnect between field memory 220 and 3D comb filter 300 for each stored component 222 and 224, stored components from multiple image fields or multiple components within one image field, or both, may be provided to 3D comb filter 300 concurrently. A person of reasonable skill in the art should recognize that the field memory 220 may be of any type or size depending on the application, cost, and other system constraints.

The 3D comb filter 300 generates chrominance 302 and luminance 304 data responsive to components 212 and 214 from Y/C separator 210 and stored components 222 and 224 from field memory 220. In one embodiment, 3D comb filter 300 generates data 302 and 304 by temporally processing components 212 and 214 from a current image field responsive to corresponding stored components 222 and 224 from at least one previous image field. Alternatively, the 3D comb filter 300 generates data 302 and 304 by temporally processing stored components 222 and 224 from one image field responsive to components 212 and 214 from a current image field and/or stored components 222 and 224 from a second image field.

Figure 3:
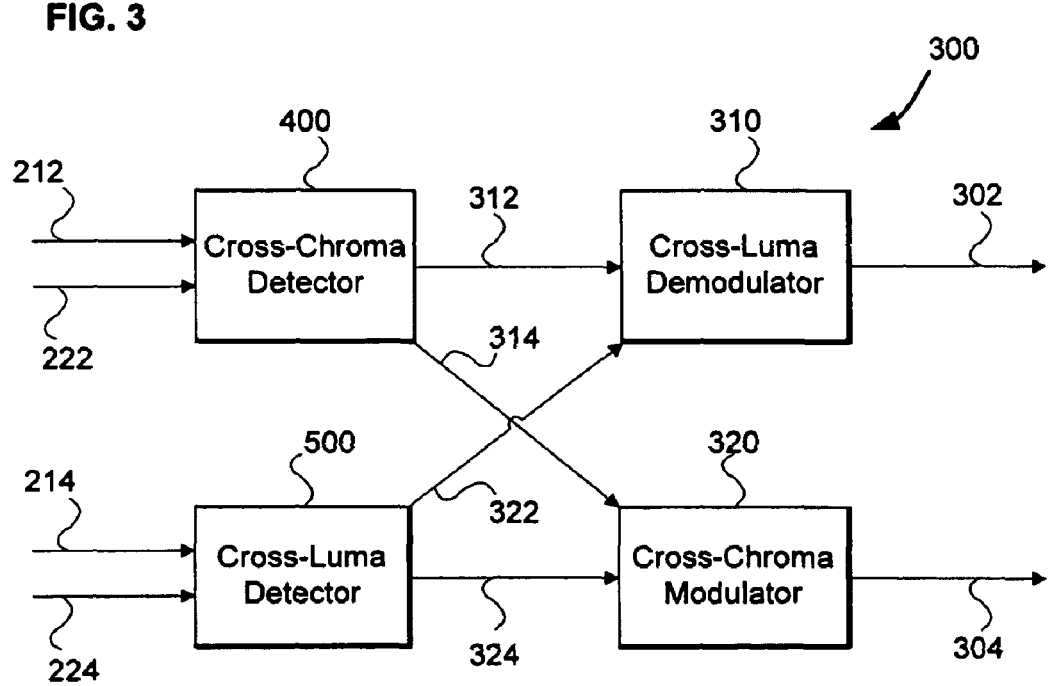
FIG. 3 is a block diagram of an embodiment of the comb filter shown in FIG. 2.

FIG. 3 is a block diagram of an embodiment of the 3D comb filter 300 shown in FIG. 2. Referring to FIG. 3, the 3D comb filter 300 reduces imperfections in Y/C separation by detecting and removing the crosstalk from each component and recombining the removed crosstalk with the corresponding component. Although 3D comb filter 300 is shown to process image data components 212 and 214 from Y/C separator 210 or directly from digital video signal 109 responsive to stored components 222 and 224 from field memory 220, in some embodiments 3D comb filter 300 may process the stored components 222 and 224 from field memory 220 responsive to image data components 212 and 214 and/or other stored components 222 and 224 from the field memory 220.

The 3D comb filter 300 includes a cross-chroma detector 400 to detect cross-chroma 314, or luminance information, within chrominance component 212 responsive to the stored chrominance component 222. Since the change in chrominance over two or more image fields includes image content changes (chrominance motion) and changes due to cross-chroma 314, the cross-chroma detector 400 may detect cross-chroma 314 by determining the change in chrominance, estimating the chrominance motion over the fields, and reducing the change in chrominance with the estimated chrominance motion. Alternatively, cross-chroma detector 400 may detect cross-chroma 314 within stored chrominance component 222 responsive to chrominance component 212.

The cross-chroma detector 400 generates adjusted chrominance data 312 responsive to the chrominance component 212 and the stored chrominance component 222. The adjusted chrominance data 312 may be generated by removing the cross-chroma 314 from the chrominance component 212. Alternatively, cross-chroma detector 400 may generate adjusted chrominance data 312 by removing the cross-chroma 314 from the stored chrominance component 222. The cross-chroma detector 400 provides the adjusted chrominance data 312 to a cross-luma demodulator 310 and the cross-chroma 314 to a cross-chroma modulator 320.

3D comb filter 300 includes a cross-luma detector 500 to detect cross-luma 322, or chrominance information, within luminance component 214 responsive to stored luminance component 224. Since the change in luminance over two or more image fields includes image content changes (luminance motion) and changes due to cross-luma 322, the cross-luma detector 500 may estimate cross-luma 322 by determining the change in luminance, estimating luminance motion over the fields, and reducing the change in luminance with the estimated luminance motion. Alternatively, cross-luma detector 500 detects cross-luma 322 within stored luminance component 224 responsive to luminance component 214.

The cross-luma detector 500 generates adjusted luminance data 324 responsive to the luminance component 214 and stored luminance component 224. The adjusted luminance data 324 may be generated by removing the cross-luma 322 from the luminance component 214. Alternatively, cross-luma detector 500 may generate the adjusted luminance data 324 by removing the cross-luma 322 from the stored luminance component 224. The cross-luma detector 500 provides the adjusted luminance data 324 to the cross-chroma modulator 320 and the cross-luma 322 to the cross-luma demodulator 310.

The cross-luma demodulator 310 generates the chrominance data 302 responsive to the adjusted chrominance data 312 and the cross-luma 322. Since the cross-luma 322 is modulated color sub-carrier, the cross-luma demodulator 310 may generate the chrominance data 302 by demodulating the cross-luma 322 and combining the demodulated cross-luma to the adjusted chrominance data 312. The cross-luma 322 may be demodulated according to a sub-carrier phase and frequency used by the video decoder 122 to demodulate the digital video signal 109.

The cross-chroma modulator 320 generates luminance data 304 responsive to the adjusted luminance data 324 and the cross-chroma 314. Since the cross-chroma 314 is demodulated luminance information, the cross-luma modulator 320 may generate the luminance data 304 by modulating the cross-chroma 314 and combining the modulated cross-luma to the adjusted luminance data 324. The cross-chroma 314 may be modulated according to the sub-carrier phase and frequency used by the video decoder 122 to generate the digital video signal 109, or used by the Y/C separator 210 to separate the digital video signal 109. When the sub-carrier phase and frequency information is not available to the 3D comb filter 300, e.g., in component video signals demodulated externally from system 200, the cross-luma demodulator 310 and the cross-chroma modulator 320 pass chrominance data 312 and luminance data 324, respectively, as the chrominance data 302 and 304. In other words, the 3D comb filter 300 reduces the chrominance and luminance components 212 and 214 by amount of cross-luma 322 and cross-chroma 314 present in the image, but does not restore the signal to the original quality by recombining the cross-luma 322 and cross-chroma 314 with their respective components 212 and 214.

3D comb filter 300 may include noise reduction capability to adjust the cross-chroma 314 and cross-luma 322 responsive to a noise measurement. Controller 150 may measure the transmission noise of digital video signal 109, e.g., random noise, white noise, or the like, and provide the noise measurement to the signal processing system 200. A person of reasonable skill in the art knows well methods of noise detection and measurement. In one implementation of noise reduction, the processing system 200 reduces the cross-chroma 314 and the cross-luma 322 prior to modulation and demodulation, respectively, thus reducing the amount of the removed cross-chroma 314 and cross-luma 322 combined with adjusted chrominance data 312 and the adjusted luminance data 324. In another implementation of noise reduction, the processing system 200 increases the cross-chroma 314 and the cross-luma 322 estimates according to the noise measurements prior to generating the adjusted chrominance data 312 and the adjusted luminance data 324, respectively.

Figure 4:
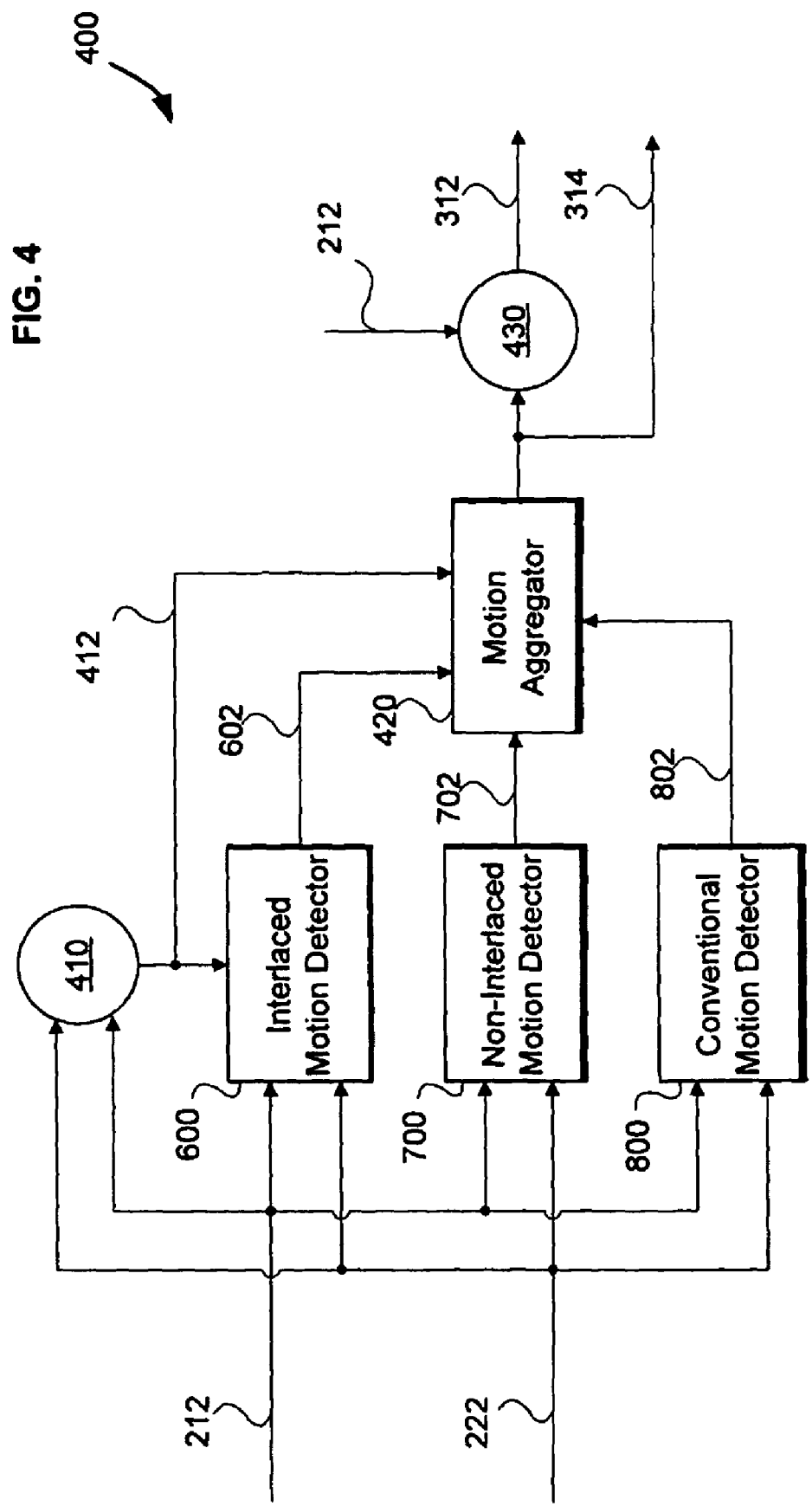
FIG. 4 is a block diagram of an embodiment of the cross chroma detector shown in FIG. 3.

FIG. 4 is a block diagram of an embodiment of the cross-chroma detector 400 shown in FIG. 3. Referring to FIG. 4, cross-chroma detector 400 includes a difference block 410 to determine the change 412 in chrominance over two or more image fields responsive to chrominance components 212 and 222, where chrominance component 212 is from a current image field and stored chrominance component 222 is from one or more previous image fields. The difference block 410 provides the chrominance change 412 to an interlaced motion detector 600 and a motion aggregator 420.

The interlaced motion detector 600 determines an interlaced chrominance motion estimate 602 responsive to chrominance change 412 and chrominance components 212 and 222, and provides the interlaced motion estimate 602 to the motion aggregator 420. A non-interlaced motion detector 700 determines a non-interlaced chrominance motion estimate 702 responsive to chrominance components 212 and 222, and provides the non-interlaced motion estimate 702 to the motion aggregator 420. A conventional motion detector 800 determines a conventional chrominance motion estimate 802 responsive to chrominance components 212 and 222, and provides the conventional motion estimate 802 to the motion aggregator 420. Embodiments of detectors 600, 700, and 800 will be discussed in greater detail below with reference to FIGS. 6, 7, and 8, respectively.

Motion aggregator 420 generates cross-chroma 314 responsive to chrominance change 412 and chrominance motion estimates 602, 702 and 802, and provides cross-chroma 314 to cross-chroma modulator 320 (FIG. 3) and difference block 430. Motion aggregator 420 may generate cross-chroma 314 by aggregating the chrominance motion estimates 602, 702 and 802 into a total chrominance motion estimate and reducing the chrominance change 412 according to the total chrominance motion estimate. The aggregation may include selecting either the interlaced motion estimate 602 or the non-interlaced motion estimate 702, and combining the selected estimate 602 or 702 with the conventional motion estimate 802. In one embodiment, cross-chroma detector 400 may contain fuzzy logic to adjust each chrominance motion estimate 602, 702 and 802 prior to aggregation, where each fuzzy adjusted motion estimate indicates a level of membership within predefined fuzzy group or set. The cross-chroma detector 400 may implement the fuzzy logic in corresponding motion detectors 600, 700, and 800, in motion aggregator 420, or within a distinct fuzzy logic module (not shown).

The difference block 430 generates adjusted chrominance data 312 by removing the cross-chroma 314 from chrominance component 212. Alternatively, the difference block 430 removes the cross-chroma 314 from stored chrominance component 222.

Figure 5:
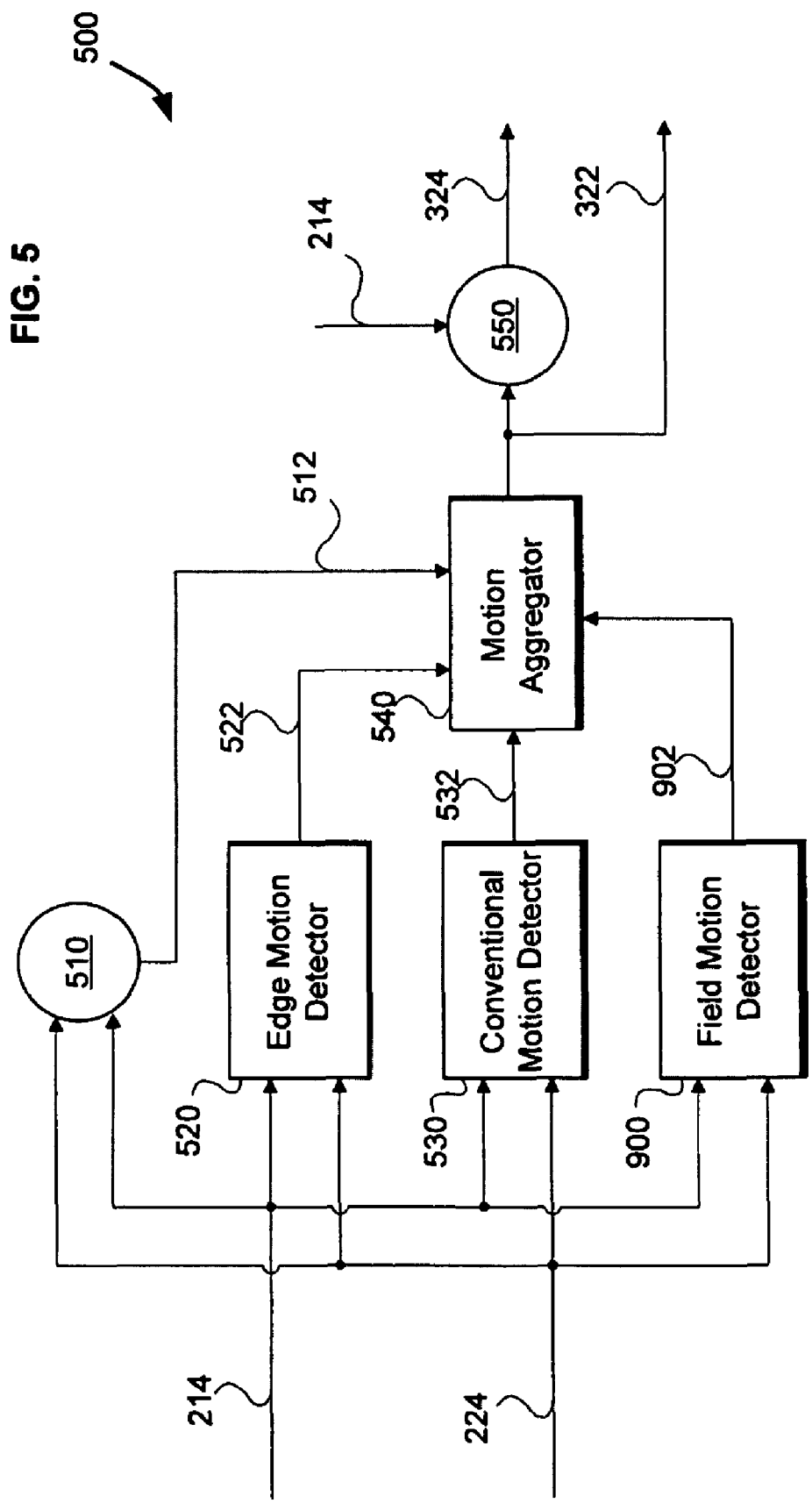
FIG. 5 is a block diagram of an embodiment of the cross luma detector shown in FIG. 3.

FIG. 5 is a block diagram of an embodiment of the cross-luma detector 500 shown in FIG. 3. Referring to FIG. 5, cross-luma detector 500 operates similarly to cross-chroma detector 400, except the cross-luma detector 500 temporally processes luminance component 214. Because the cross-luma is caused by a portion of the color sub-carrier crossing over into the luminance components 214 and 224, the luminance components 214 and 224 may be filtered, e.g. with a high pass filter, to isolate the frequencies near to the color sub-carrier.

Cross-luma detector 500 includes a difference block 510 to determine a change 512 in luminance over two or more image fields responsive to luminance components 214 and 224, where luminance component 214 is from a current image field and stored luminance component 224 is from one or more previous image fields. The difference block 510 provides the luminance change 512 to a motion aggregator 540.

An edge motion detector 520 determines an edge motion estimate 522 responsive to luminance components 214 and 224, and provides the edge motion estimate 522 to the motion aggregator 540. In one embodiment, edge motion detector 520 isolates the low frequency portion of the luminance components 214 and 224 using a notch/bandpass filter combination to determine the edge motion estimate 522.

A conventional motion detector 530 determines a conventional motion estimate 532 responsive to luminance components 214 and 224, and provides the conventional motion estimate 532 to the motion aggregator 540. In one embodiment, the conventional motion estimate 532 is the difference between the current field luminance component 214 and stored luminance component 224 from four fields ago.

A field motion detector 900 determines a field motion estimate 902 responsive to luminance components 214 and 224, and provides the field motion estimate 902 to the motion aggregator 540. Embodiments of the field motion detector 900 will be discussed in greater detail below with reference to FIG. 9.

Motion aggregator 540 generates cross-luma 322 responsive to luminance change 512 and luminance motion estimates 522, 532 and 902, and provides cross-luma 322 to cross-luma demodulator 310 (FIG. 3) and difference block 550. Motion aggregator 540 may generate cross-luma 322 by aggregating the luminance motion estimates 522, 532 and 902 into a total luminance motion estimate and reducing the luminance change 512 according to the total luminance motion estimate. The aggregation may include selecting among or aggregating the estimates 522, 532 and 902. In one embodiment, cross-luma detector 500 may contain fuzzy logic to adjust each luminance motion estimate 522, 532 and 902 prior to aggregation, where each fuzzy adjusted motion estimate indicates a level of membership within predefined fuzzy group or set. The cross-luma detector 500 may implement the fuzzy logic in corresponding motion detectors 520, 530, and 900, in motion aggregator 540, or within a distinct fuzzy logic module (not shown).

The difference block 550 generates adjusted luminance data 324 by removing the cross-luma 322 from luminance component 214. Alternatively, the difference block 550 removes the cross-luma 322 from stored luminance component 224.

Embodiments of the cross-chroma detector 400 will be explained with reference to FIGS. 6-8. The following embodiments receive chrominance component 212 as pixels from a current field PCF, and stored chrominance component 222 as pixels from one field ago P1FT and P1FB, and two fields ago P2F, where each pixel represents a chroma value in the UV plane. When the digital video signal 109 is interlaced the pixels from one field ago P1FT and P1FB correspond to top and bottom pixels, respectively.

Figure 6:
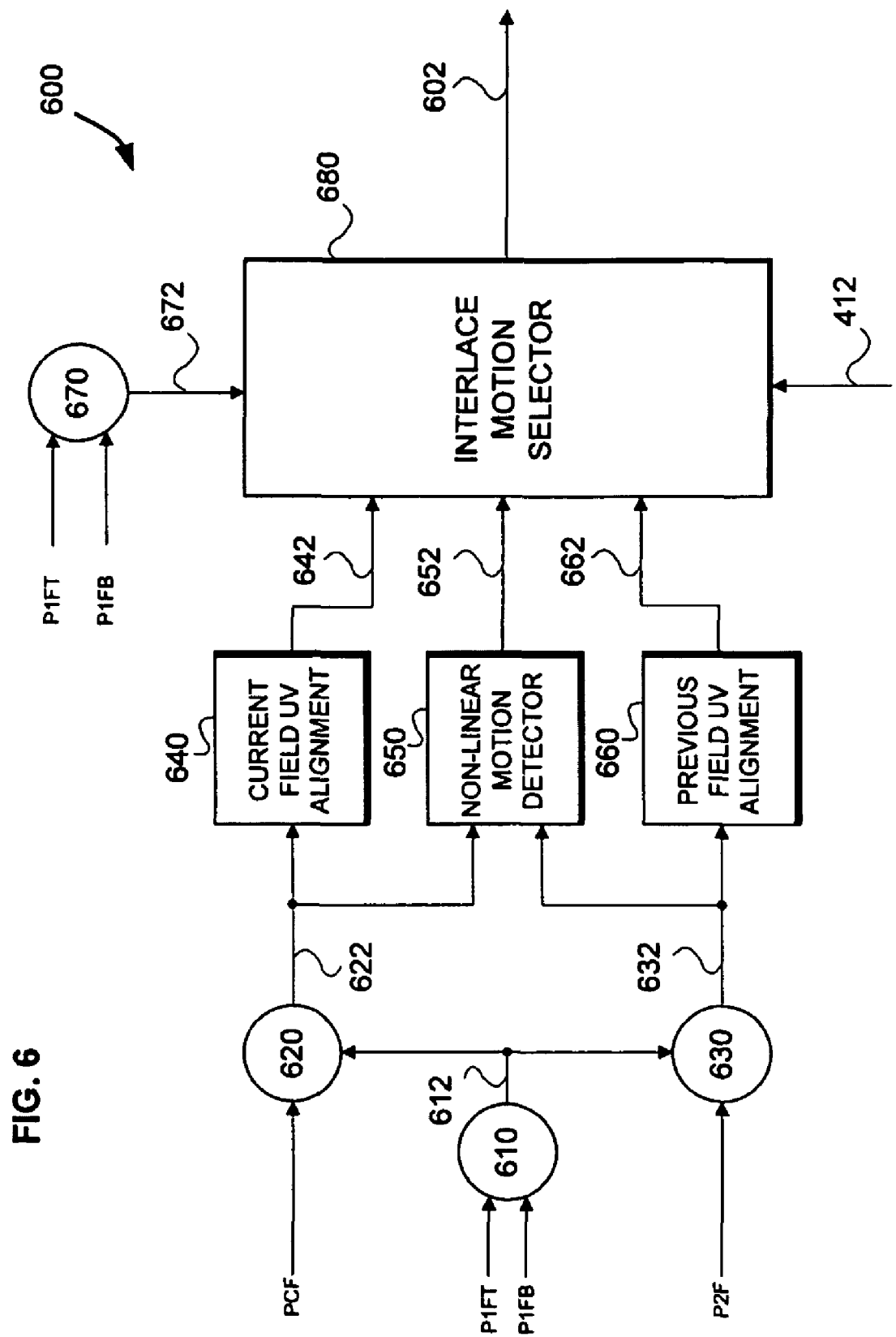
FIG. 6 is a block diagram of an embodiment of the interlaced motion detector shown in FIG. 4.

FIG. 6 is a block diagram of an embodiment of the interlaced motion detector 600 shown in FIG. 4. Referring to FIG. 6, the interlaced motion detector 600 determines the interlaced motion estimate 602 by detecting when diagonal features known to cause crosstalk are present in the image data. Since adjacent image fields of interlaced image data are not spatially cosited, interlaced motion detector 600 includes an interpolator 610 to vertically interpolate a pixel 612 from pixels one field ago P1FT and P1FB. Pixel 612 has a spatial position corresponding to pixels PCF and P2F. When the interlaced image data is NTSC (National Television Systems Committee), the interpolator 610 may average the pixels P1FT or P1FB. When the interlaced image data is PAL (Phase Alternating Line), the interpolator 610 may select one of the pixels P1FT or P1FB. The interpolator 610 provides the vertically interpolated pixel 612 to difference blocks 620 and 630.

The difference block 620 determines UV motion 622 between the current field pixel PCF and the spatially interpolated pixel 612, and provides the UV motion determination 622 to the current field UV alignment 640 and the non-linear UV motion detector 650. The UV motion determination 622 may be the chrominance change between pixels PCF and 612.

The difference block 630 determines UV motion 632 between the pixel two fields ago P2F and the spatially interpolated pixel 612, and provides the UV motion determination 632 to the previous field UV alignment 660 and the non-linear UV motion detector 650. The UV motion determination 632 may be the chrominance change between pixels P2F and 612.

The current field UV alignment 640 and previous field UV alignment 660 align the U and the V portions of the UV motion determinations 622 and 632, respectively, according to the implemented sampling standard, e.g., a +/−1 delay for 601 style sampling, no delay for 4:4:4 sampling, or an interpolator for other standards. UV alignments 640 and 660 may determine the direction of the diagonal stripes from the polarity of the U and V portions of the UV motion determinations

622 and 632 and adjust the alignment according to the direction of the diagonal stripes. The current field UV alignment 640 and previous field UV alignment 660 provide the aligned UV motion determinations 642 and 662, respectively, to interlace motion selector 680.

The non-linear UV motion detector 650 detects UV motion 652 over two image fields (PCF and P2F) caused by cross-chroma responsive to the UV motion determinations 622 and 632. Since UV motion without cross-chroma is typically linear, the non-linear UV motion detector 650 detects the non-linearity of the UV motion responsive to the UV motion determinations 622 and 632. The non-linearity may be detected by determining the difference between the horizontal variance, e.g., the change between PCF and P2F, and the vertical variance, e.g., the change between P1FT and P1FB. The non-linear UV motion detector 650 may perform UV alignment similar to UV alignments 640 and 660 prior to detecting UV motion 652. The non-linear UV motion detector 650 provides the UV motion 652 to interlace motion selector 680.

The interlaced motion detector 600 may include a difference block 670 to determine UV motion 672 between the pixels one field ago P1FT and P1FB, and to provide the UV motion determination 672 to interlace motion selector 680. The UV motion 672 may be the difference between the pixels one field ago P1FT and P1FB.

The interlace motion selector 680 determines the interlace motion estimate 602 responsive to UV motion determinations 642, 652, 662, and 672, and the chrominance change 412. The interlace motion selector 680 may generate the interlace motion estimate 602 by selecting one of the motion determinations 642, 652, 662, and 672, by blending the motion determinations 642, 652, 662, and 672, or both. In one embodiment, the UV motion determination 672 may be selected as the interlace motion estimate 602 when Y/C separator 210 is a notch/bandpass filter. Since UV motion determinations 642, 652, 662, and 672 are estimates of the cross-chroma present in the image data, interlace motion selector 680 may determine the interlace motion estimate 602 by reducing the chrominance change 412, or total chrominance motion, by the selected UV motion determination 642, 652, 662, or 672. In some embodiments, the UV motion determinations 642, 652, 662, or 672 are converted into interlace motion estimates prior to the selection by the interlace motion selector 680.

FIG. 7 is a block diagram of an embodiment of the non-interlaced motion detector 700 shown in FIG. 4. Referring to FIG. 7, the non-interlaced motion detector 700 determines the non-interlaced motion estimate 702 responsive to pixels PCF, P1FT, P1FB, and P2F. As opposed to the interlaced motion detector 600, the non-interlaced motion detector 700 determines the non-interlaced motion estimate 702 directly from the non-cosited pixels PCF, P1FT, P1FB, and P2F.

Non-interlaced motion detector 700 includes difference blocks 710 and 720 to determine UV motion estimates 712 and 722, respectively, from the pixels. The difference block 710 determines UV motion 712 between the pixels PCF and P1FT, and provides the UV motion determination 712 to non-interlaced motion selector 730. The difference block 720 determines UV motion 722 between the pixels P2F and P1FB, and provides the UV motion determination 722 to non-interlaced motion selector 730. Although non-interlaced motion detector 700 shows two difference block 710 and 720, in some embodiments UV motion between other non-cosited pixels may be determined and provided to selector 730.

The non-interlaced motion selector 730 generates the non-interlaced motion estimate 702 responsive to the UV motion determinations 712 and 722. The non-interlaced motion estimate 702 may be the UV motion determination 712 or 722 with the smallest absolute magnitude. In some embodiments, the non-interlaced motion selector 730 may generate the non-interlaced motion estimate 702 responsive to low frequency luminance motion determined in cross-luma detector 500 (FIGS. 3 and 5).

FIG. 8 is a block diagram of an embodiment of the conventional motion detector 800 shown in FIG. 4. Referring to FIG. 8, the conventional motion detector 800 determines the conventional chrominance motion estimate 802 responsive to pixels from the current field PCF, pixels from two fields ago P2F, and pixels from four fields ago P4F.

The conventional motion detector 800 includes a NTSC detector 810 to generate a NTSC conventional motion estimate 812 responsive to pixels PCF and P4F. The NTSC conventional motion estimate 812 may be the change in chrominance between pixels PCF and P4F. The NTSC detector 810 provides the NTSC conventional motion estimate 812 to conventional motion selector 830.

A PAL detector 820 generates a PAL conventional motion estimate 822 responsive to pixels PCF, P2F, and P4F. The PAL conventional motion estimate 822 may be the sum of the chrominance change between pixels PCF and P4F, and the chrominance change between pixel P2F and the average of pixels PCF and P4F. Due sub-carrier phase shifts every two image fields in a PAL standard, the PAL detector 820 may perform UV alignment during the generation of the PAL conventional motion estimate 822. The PAL detector 820 provides the PAL conventional motion estimate 822 to conventional motion selector 830. Although FIG. 8 shows PAL detector 820 generating the PAL conventional motion estimate 822 with pixels over four image fields, in some embodiments a six-field conventional chrominance motion approach is advantageous. The conventional motion selector 830 determines the conventional motion estimate 802 by selecting between the NTSC conventional motion estimate 812 and the PAL conventional motion estimate 822.

Figure 9:
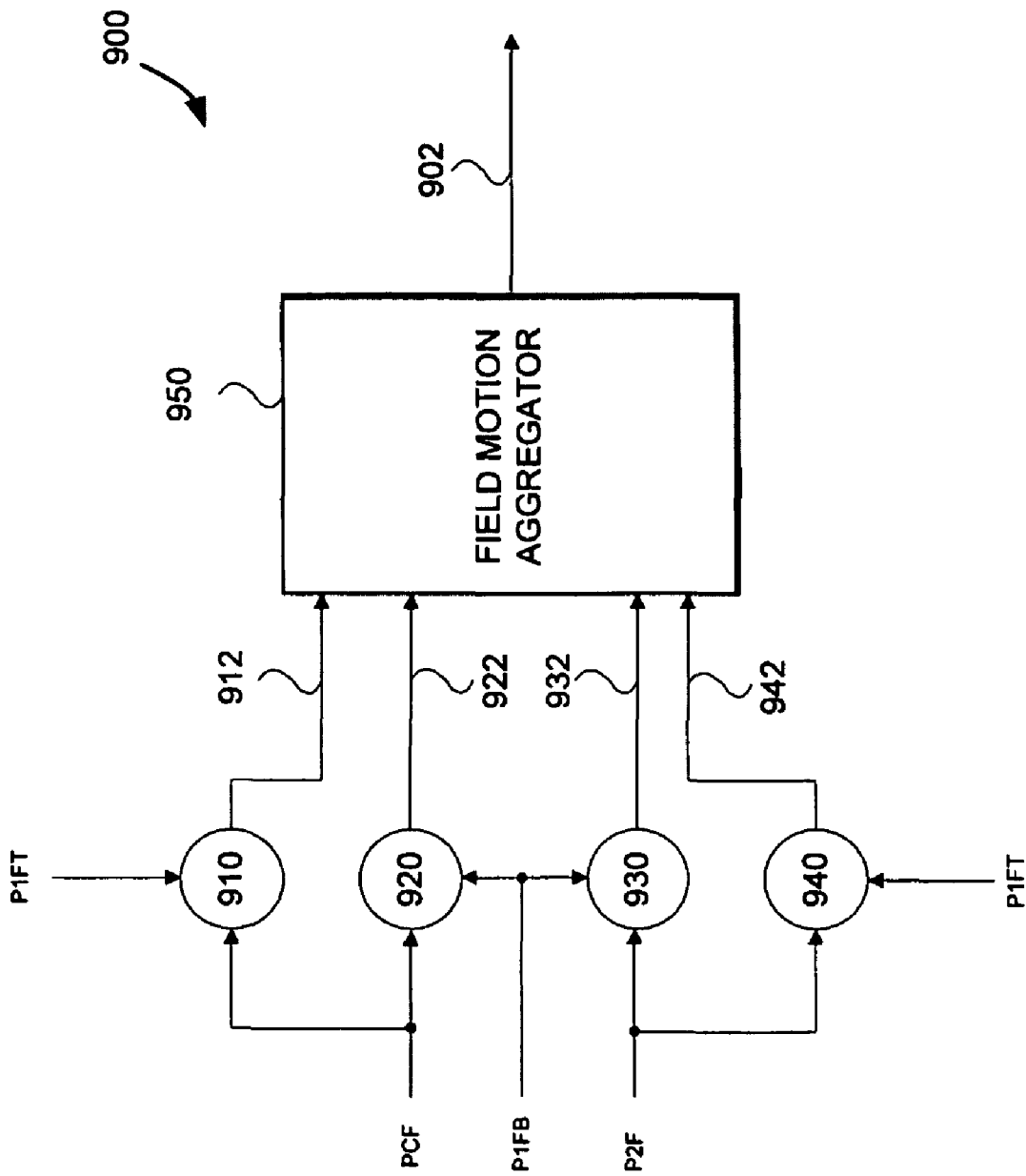
FIG. 9 is a block diagram of an embodiment of the field motion detector shown in FIG. 5.

FIG. 9 is a block diagram of an embodiment of the field motion detector 900 shown in FIG. 5. The following embodiments receive luminance component 214 as pixels from a current field PCF, and stored luminance component 224 as pixels from one field ago P1FT and P1FB, and two fields ago P2F, where each pixel represents a luminance value. When the digital video signal 109 is interlaced the pixels from one field ago P1FT and P1FB correspond to top and bottom pixels, respectively.

Referring to FIG. 9, field motion detector 900 includes a plurality of difference blocks 910, 920, 930, and 940 to determine differences 912, 922, 932, and 942, respectively. Difference block 910 determines difference 912 responsive to pixels PCF and P1FT. When digital video signal 109 is a PAL signal, difference block 910 may determine difference 912 according to (P1FT+P2F−PCF−P4F)/2, where P4F represents a pixel from four fields ago. Difference block 920 determines difference 922 responsive to pixels PCF and P1FB. Difference block 930 determines difference 932 responsive to pixels P2F and P1FB. When digital video signal 109 is a PAL signal, difference block 930 may substitute pixel P2F with pixel P4F. Difference block 940 determines difference 942 responsive to pixels P2F and P1FT. Difference blocks 910, 920, 930, and 940 provide the corresponding differences 912, 922, 932, and 942 to a filed motion aggregator 950.

The field motion aggregator 950 determines the field motion estimate 902 responsive to differences 912, 922, 932, and 942. In one embodiment, the field motion aggregator 950 determines the field motion estimate 902 by selecting the minimum absolute value of differences 912, 922, 932, or 942.

Since the differences 912, 922, 932, and 942 assume there is no vertical change in cross-luma, field motion detector 900 may determine several other motion estimates that take into account vertically changing cross-luma. For instance, field motion detector 900 may estimate field motion according to high frequency content in the previous field (pixels P1FT and P1FB), or by limiting the field motion estimate to the difference between pixels PCF and P2F reduced by the difference between pixels P1FT and P1FB. Alternatively, the field motion may be estimated based on the ratios of adjacent pixels from the previous field (P1FT) and the current field (PCF). Equation 1 shows the ratios of adjacent pixels with no field motion, where the pixel index i indicates the location of the pixels within the image frame.

$$P1FT_i/PCF_i = P1FT_{i+1}/PCF_{i+1} \qquad \text{Equation 1}$$

When field motion is present, however, Equation 1 may be rearranged to determine an estimate of the field motion, as shown in Equation 2.

$$\text{Estimate of Field Motion} = (P1FT_i * PCF_{i+1}) - (P1FT_{i+1} * PCF_i) \qquad \text{Equation 2}$$

The field motion detector 900 may provide any combination of these motion estimates to field motion aggregator 950, where the field motion aggregator 950 may select between them and the differences 912, 922, 932, and 942 to determine the field motion estimate 902.

FIG. 10 is an example flowchart 1000 of a method embodiment for operating 3D comb filter 300. Referring to FIG. 10, the 3D comb filter 300 receives separated luminance and chrominance components from two or more image fields at block 1010. The 3D comb filter 300 detects cross-chroma, or luminance information, within a chrominance component from one of the image fields responsive to the at least one chrominance component the other image fields at block 1020 and reduces the chrominance component according to the detected cross-chroma at block 1030. The cross-chroma may be detected by determining a difference in the chrominance between two or more of the image fields, estimating chrominance motion due to image content changes over the image fields, and reducing the difference in the chrominance by the estimated chrominance motion. In some embodiments, the detected cross-chroma may be modified in response to a noise measurement prior to the reduction at block 1030.

The 3D comb filter 300 detects cross-luma, or chrominance information, within a luminance component from one of the image fields responsive to at least one luminance component from the other image fields at block 1040 and reduces the luminance component according to the detected cross-luma at block 1050. The cross-luma may be detected by determining a difference in the luminance between two or more of the image fields, estimating luminance motion due to image content changes over the image fields, and reducing the difference in the luminance by the estimated luminance motion. In some embodiments, the detected cross-luma may be modified in response to a noise measurement prior to the reduction at block 1050.

According to a next block 1060, the 3D comb filter 300 modulates the detected cross-chroma and demodulates the detected cross-luma. The detected cross-chroma and cross-luma may be modified responsive to a noise measurement prior to the execution of block 1060. Although block 1060 is shown as being performed subsequent to blocks 1040 and 1050, their order of operation may be concurrent or reversed. The 3D comb filter 300 combines the demodulated cross-luma with the reduced chrominance component at block 1070 and combines the modulated cross-chroma with the reduced luminance component at block 1080.

Having illustrated and described the principles of our invention, it should be readily apparent to those skilled in the art that the invention may be modified in arrangement and detail without departing from such principles. I claim all modifications coming within the spirit and scope of the accompanying claims.

I claim the following:

1. A system comprising:
    a Y/C separator operable to separate an image field into luminance and chrominance components;
    a comb filter operable to temporally process the separated luminance and chrominance components from the image field responsive to image data from at least one other image field, where the comb filter comprises:
        a cross-chroma detector operable to detect luminance information within the chrominance components from the image field responsive to the image data from the at least one other image field, where the cross-chroma detector is further operable to reduce the chrominance components from the image field responsive to the detected luminance information;
        a cross-luma detector operable to detect chrominance information within the luminance components from the image field based on the image data from the at least one other image field; and
        a cross-luma demodulator operable to demodulate the chrominance information and to combine the demodulated chrominance information with the reduced chrominance components; and
    a non-volatile memory operable to store the image field and the at least one other image field.

2. The system of claim 1 where the cross-chroma detector comprises a noise reducer operable to reduce the chrominance components responsive to a noise measurement.

3. The system of claim 1,
    where the cross-chroma detector is further operable to:
    determine a difference in chrominance data between the image field and the at least one other image field;
    estimate chrominance motion responsive to chrominance data from at least the image field and the at least one other image field; and
    detect the luminance information responsive to the difference and the chrominance motion.

4. The system of claim 3 where the cross-chroma detector is operable to estimate the chrominance motion using fuzzy logic.

5. The system of claim 1,
    where the cross-luma detector is further operable to:
    determine a difference in luminance data between the image field and the at least one other image field;
    estimate luminance motion responsive to luminance data from the image field and the at least one other image field; and
    detect the chrominance information responsive to the difference and the luminance motion.

6. The system of claim 5 where the cross-luma detector is operable to estimate the luminance motion using fuzzy logic.

7. The system of claim 1, further comprising a panel to display the processed components.

8. The system of claim 1, wherein the Y/C separator comprises a notch/bandpass filter set.

9. The system of claim 1, wherein the Y/C separator comprises a comb filter set implementing one of 1D and 2D separation.

10. The system of claim 9, wherein the Y/C separator further comprises a notch/bandpass filter set and wherein the Y/C separator is operable to adapt between the comb filter set and the notch/bandpass filter set responsive to a digital video signal received by the Y/C separator.

11. A system comprising:
- a Y/C separator operable to separate an image field into luminance and chrominance components;
- a comb filter operable to temporally process the separated luminance and chrominance components from the image field responsive to image data from at least one other image field, where the comb filter comprises:
  - a cross-chroma detector operable to detect luminance information within the chrominance components from the image field responsive to the image data from the at least one other image field;
  - a cross-luma detector operable to detect chrominance information within the luminance components from the image field responsive to the image data from the at least one other image field, where the cross-luma detector is further operable to reduce the luminance components from the image field based on the detected chrominance information; and
  - a cross-chroma modulator operable to modulate the luminance information and to combine the modulated luminance information with the reduced luminance components; and
- a non-volatile memory operable to store the image field and the at least one other image field.

12. The system of claim 11 where the cross-luma detector comprises a noise reducer operable to reduce the luminance components responsive to a noise measurement.

13. The system of claim 11, further comprising a panel to display the processed components.

14. The system of claim 11, wherein the Y/C separator comprises a notch/bandpass filter set.

15. The system of claim 11, wherein the Y/C separator comprises a comb filter set implementing one of 1D and 2D separation.

16. The system of claim 15, wherein the Y/C separator further comprises a notch/bandpass filter set and wherein the Y/C separator is operable to adapt between the comb filter set and the notch/bandpass filter set responsive to a digital video signal received by the Y/C separator.

17. The system of claim 11, where the cross-chroma detector is further operable to:
- determine a difference in chrominance data between the image field and the at least one other image field;
- estimate chrominance motion responsive to chrominance data from at least the image field and the at least one other image field; and
- detect the luminance information responsive to the difference and the chrominance motion.

18. The system of claim 17 where the cross-chroma detector is operable to estimate the chrominance motion using fuzzy logic.

19. The system of claim 11, where the cross-luma detector is further operable to:
- determine a difference in luminance data between the image field and the at least one other image field;
- estimate luminance motion responsive to luminance data from the image field and the at least one other image field; and
- detect the chrominance information responsive to the difference and the luminance motion.

20. The system of claim 19 where the cross-luma detector is operable to estimate the luminance motion using fuzzy logic.

* * * * *